Patented Nov. 3, 1936

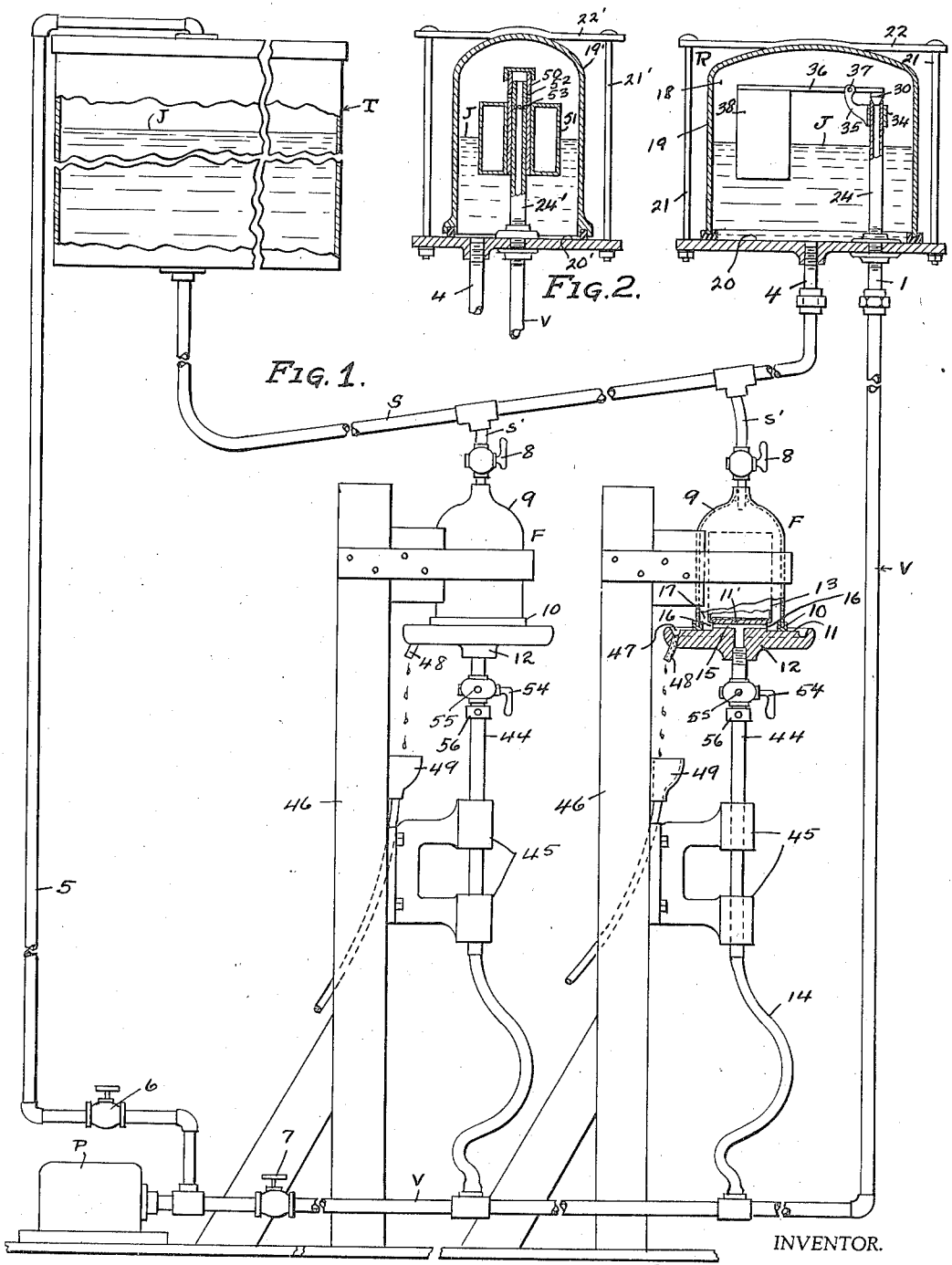

2,059,455

UNITED STATES PATENT OFFICE 2,059,455

AUTOMATIC AIR RELEASE MEANS FOR VACUUM SYSTEMS

Stedman B. Hoar, Orange, Calif., assignor, by mesne assignments, to Natural Food Products Company, a corporation of Delaware Application January 21, 1935, Serial No. 2,677

10 Claims. (Cl. 226—116)

This invention relates to and has for an object the provision of an improved method and means for releasing air from vacuum systems such as are employed in filling containers with a liquid, particularly useful in the canning or bottling of fruit juices.

In the operation of a system for the purpose described the fruit juices are usually held in a large vat or tank, from which the juices flow by gravity, or vacuum, to a battery of fillers. A vacuum pump is connected with the top of the tank and also with the fillers so that a balanced vacuum is maintained throughout. The containers for the juices are held during the filling operations within vacuum chambers so as to exclude air as far as possible from the containers.

Each filler, however, is controlled by a valve which regulates the flow of juice from the supply line to the containers, and air sometimes leaks through the valves and finds its way in the form of bubbles into the juice as it enters the containers, thus hastening the deterioration of the juices.

It is, therefore, an object of my invention to provide an air release device connected in the vacuum line from the pump and also in the supply line from the tank, and including an automatically operable valve so positioned and arranged as to prevent the movement of the air downwardly into the juice containers and induce the flow thereof upwardly into and from a suitable receptacle or chamber connected with the vacuum pump.

Accordingly, when my improvements are installed in a vacuum system for canning or bottling fruit juices or other liquids air will be excluded from the containers and the canned or bottled juices will not be subject to deterioration, as in the present methods employed.

Other objects may appear as the description of my invention progresses.

I have shown in the accompanying drawing a preferred embodiment of my invention, subject to modification within the scope of the appended claims without departing from the spirit thereof.

In said drawing:

Fig. 1 is a view, in elevation of a vacuum system embodying my improvements, and with portions shown in section to better show the inner construction.

Fig. 2 is a sectional elevation of a modified form of the automatic air release valve.

The typical system shown in the drawing usually includes a tank T for holding a substantial quantity of fruit juice J and connected at its top with a vacuum pump P. A supply pipe S leads from the bottom of the tank T to a plurality of filling units F, F, etc., each of which is connected with the supply line S by means of branch pipes S', S', etc. Each of the units F is also connected with a main vacuum line V leading to the pump P.

In addition to the elements named I add to the system an air release device R which is connected with the vacuum pipe V directly as by means of a section of pipe 1. The supply pipe S, beyond the remotest of the filler units F also connects with the bottom of the release device R by means of a section of pipe 4.

It will be noted that the vacuum pipe 5 from the pump P to the tank T has a control valve 6 therein and the main vacuum line V has a similar valve 7 therein at a point between the pump P and the nearest of the filler units F. Also each of the branch filling pipes S' has a valve 8 intermediate the main pipe S and the filling unit F.

The type of filling unit shown includes a stationary hood 9, usually of glass and having an air tight connection with the pipe S'. On the bottom of the hood 9 a rubber gasket 10 is held for the purpose of making air tight engagement with the table or plate 11 of a movable member 12 of the unit.

The members 12 of the filler units are adapted to be manually operated for moving the plates 11 thereof into and from engagement with the gaskets 10 of the associated hoods, so that cans or receptacles 13 held on said plates may be held within the hoods 9 and beneath the outlets of pipes S' during filling operations. The members 12 are each secured to the upper ends of a pipe 44 vertically slidable in bearings 45 supported on a post 46 and the lower end of the pipe 44 has a flexible tube 14 leading to the main vacuum pipe V, and said pipe 44 communicates with passages 15 formed in the plates 11 having outlets 16 on the side of a can supporting boss 11' formed on said plate. Thus, when the two filler members 9 and 12 are in engagement the chambers 17 within hoods 9 are subjected to the suction in tubes 14 and pipe V, for the purpose of evacuating the chambers 17 of air preparatory to the filling of the cans 13 with the juice J. Plate 11 has an annular gutter 47 formed around its edge fitted at one point with a drain spout 48 draining any spilled juice into a funnel 49 from which it runs to waste.

The main supply pipe S is inclined upwardly from a point intermediate tank T and the first filler unit F to a point below the air release device R so that any air which may leak through the joints and connections of the supply pipes S and S', or particularly through the valves 8, will rise into the chamber 18 of a receptacle 19 forming a housing for the air release device R.

The receptacle 19 is preferably formed of glass and is of inverted cup shape with the open end thereof resting upon and suitably sealed against the upper side of a supporting plate 20. Said receptacle may be detachably supported on plate 20 as by means of a pair or more of stay rods 21 secured at their lower ends to the plate 20 and at their upper ends to a cross bar, or bars, or a skeleton member 22.

As shown in the drawing the end of pipe 4 from the juice supply line is secured to and is open at the top of plate 20 so that the juice J may flow into and partially fill the receptacle 19 to a predetermined normal level. The vacuum pipe 1 leading to the main vacuum line V also is secured to plate 20 but within extends as a tube 24 upwardly above the normal level of the juice J in the receptacle 19 and is proof against the entrance of the juice except at its upper end. The upper end of tube 24 is normally closed by a cap or valve 30 carried on an arm 36 pivoted at 37 on an upwardly turned lug 35 extending from a collar 34 attached to the upper end of tube 24, while at the outer end of arm 36 is secured a suitable float 38, thus forming a float valve to open and close the upper end of tube 24 with the drop and rise of the liquid level in chamber 18.

A variation of this float valve arrangement is shown in Fig. 2 wherein elements corresponding to those described bear similar numbers primed, but where the valve is formed of a tube 50 closed at its upper end and slidably fitting over vertical tube 24' and carrying at its lower portion a circular float 51 which will bodily raise and lower the tube 50 as the float rises and falls. The upper part of the tube 50 is pierced by one or more small holes 52 which, when the float falls, will be brought in register with a groove 53 around tube 24' pierced at one or more points with the interior of the tube. Thus the action of opening and closing of tube 24' by the rise and fall of the liquid level is practically the same as described for Fig. 1.

In either design the size of bore in the tube 24 is small enough and the weight of the float and its leverage sufficient to open the valve against the suction in pipe 1 when the float falls.

In operation, when the tank T is partially filled with the juice J and valves 6 and 7 are open, a uniform suction is created in the pipes V and 5, tank T and chamber 18 of receptacle 19. Thus the suction on both sides of the juice in tank T is balanced and the juice will flow by gravity into and upwardly through pipe S. At the institution of an operation, receptacle 19 will be void of juice and the float 38 therein will be at rest at its lowest extreme of movement, and the weight of the float will effect the opening of valve 30.

Thus, suction is created in tube 24 and chamber 18 of receptacle 19 as the juice flows into and rises in the receptacle. As the juice displaces the air in the pipes S and S' and their connections, the air rises in advance of or in bubbles with the juice into the receptacle and finally finds its way to the upper portion of chamber 18 above the level of the juice, from which it is evacuated through tube 24, pipe V and pump P.

The juice will continue to rise in the receptacle 19 until the float 38 is sufficiently elevated to close valve 30, and beyond such a level to an extent to which any remaining air in chamber 18 may be compressed. When the juice in receptacle 19 reaches its normal level the chamber 18 will be closed against the effect of the vacuum in pipe V, and if and as air may leak into the pipes S and S' through valves 8 or other connections, such air will seek a higher level and rise in and through pipes S and S' into the upper portion of chamber 18.

In the event the accumulating volume of air in chamber 18 is sufficient to overcome the gravity pressure on juice J in the bottom of said chamber, the level of the juice is gradually lowered and the float 38 is correspondingly lowered until the air valve 30 is again opened to permit the evacuation of the excess air through tube 24 and pipe V. Whereupon the level of the juice and the float are again elevated to normal positions and the valve 30 is again closed, as before.

The filling of receptacles 13 with the juice is accomplished by manually elevating the tables or plates 11 with the cans centrally positioned thereon, until the hoods 9 are in air tight engagement with the plates 11, at which times valves 54 are opened and the suction in pipes V and 14 becomes effective for evacuating the chambers 17 of the fillers of air. When a vacuum is created in the hoods 9 the valves 8 are operated for permitting a flow of the juice by gravity into the cans 13. At the completion of a filling operation valve 54 is turned off and releases the vacuum from the hood 9 through a side opening 55, the plate 11 is lowered and the can 13 is fitted with a top and is then placed on a conveyor, not shown, by means of which it is transferred to a sealing machine, not shown. A collar 56 on pipe 44 acts as a lower stop for the plate 11.

For flushing out the entire system so as to prevent unsanitary conditions and the clogging of the various pipes and connections of the system, water or a cleaning solution may be drawn from tank T into chamber 18 of the air release device R, thence outwardly through the filling units and/or pipes 14 and V.

It will be thus apparent that any air which may enter the juice pipes and connections, by ordinary leakage, breakage of a valve or valves or other parts, accident or carelessness in operation of the system, will be conducted to and evacuated from the air release chamber 18 automatically without impairing the operation of the system or a stoppage of operation. Regardless of any or all possible conditions which might otherwise affect the operation of the system, the means I have devised and shown herein will prevent the flow of juice from the device R, except by design, as when flushing the receptacle 19 and its connections.

What I claim is:

1. A filling system for liquid containers comprising a tank for the liquid, a plurality of filling units connected therewith, an air release mechanism connected with said tank and with said filling units, a vacuum system connected with said filling units and with said air release mechanism and automatically operable for collecting and releasing air which may enter said filling units and connections, and means for connecting said vacuum system with said tank at a point above the level of the liquid therein, for maintaining a balanced pressure on opposite sides of the liquid supply.

2. A filling system for liquid containers comprising a tank for the liquid, a supply line leading therefrom, a vacuum filling unit connected therewith, an air release mechanism connected with said supply line, a vacuum line connected with said filling unit and with said air release mechanism and means in said air release mechanism for collecting and releasing air which may enter said supply line and connections.

3. A filling system for liquid containers comprising a tank for the liquid, a supply line leading therefrom, a vacuum filling unit connected therewith, an air release mechanism connected with said supply line, a vacuum line connected with said filling unit and with said air release mechanism, and means in said air release mechanism for collecting and releasing air which may enter said supply line and connections, said air release mechanism including means controlled by the variable level of the liquid therein, for automatically operating the air release means.

4. A filling system for liquid containers comprising a tank for the liquid, a supply line leading therefrom, a vacuum filling unit connected therewith, an air release mechanism connected with said supply line, a vacuum line connected with said filling unit and with said air release mechanism, means in said air release mechanism for collecting and releasing air which may enter said supply line and connections, and a connection between said vacuum line and said tank at a point above the level of the liquid therein.

5. A filling system for liquid containers comprising a tank for the liquid, a supply line leading therefrom, a vacuum filling unit connected with said supply line, an air release mechanism connected with said supply line, and a vacuum system connected with said tank at a point above the level of the liquid therein and with said filling unit and said air release mechanism for automatically collecting and releasing air present in said liquid.

6. A filling system for liquid containers comprising a tank for the liquid, a supply line leading therefrom, a vacuum filling unit connected with said supply line, an air release mechanism connected with said supply line, and a vacuum system connected with said tank at a point above the level of the liquid therein and with said filling unit and said air release mechanism for automatically collecting and releasing air present in said liquid, said air release mechanism including means controlled by the variable level of the liquid therein for effecting the release of the air therefrom.

7. A filling system for liquid containers comprising a tank for the liquid, a supply line leading therefrom, a filling unit connected therewith, an air release mechanism connected with said supply line, a vacuum system connected with said air release mechanism at a point above the maximum level of the liquid therein, a valve thereat controlling the application of the vacuum, and means controlled by the level of the liquid in said air release mechanism for regulating the opening and closing of said valve.

8. A filling system for liquid containers comprising a tank for the liquid, a supply line leading therefrom, a filling unit connected therewith, an air release mechanism connected with said supply line, a vacuum system connected with said air release mechanism at a point above the maximum level of the liquid therein, a valve thereat controlling the application of the vacuum, and means controlled by the level of the liquid in said air release mechanism for regulating the opening and closing of said valve, said air release mechanism arranged to normally prevent the discharge of the air therefrom.

9. A filling system for liquid containers comprising a tank for the liquid, a supply pipe leading therefrom, a filling unit connected with said supply pipe, a combined liquid and air receptacle connected with said supply pipe, a vacuum system connected with said receptacle at a point above the maximum level of liquid therein, a valve thereat for controlling the flow of air therefrom, and means connected with said valve and controlled by the level of the liquid in said receptacle for operating said valve to release the accumulated air in said receptacle.

10. A filling system for liquid containers comprising a tank for the liquid, a supply pipe leading therefrom, a filling unit connected with said supply pipe, a combined liquid and air receptacle connected with said supply pipe, a vacuum system connected with said receptacle at a point above the maximum level of liquid therein, a valve thereat for controlling the flow of air therefrom, and means connected with said valve and controlled by the level of the liquid in said receptacle for operating said valve to release the accumulated air in said receptacle, said supply line having a point of lowest elevation at a point adjacent said filling unit and a point of maximum elevation adjacent said receptacle, whereby the air collected in said supply line may rise to said receptacle.

STEDMAN B. HOAR.